United States Patent [19]
Mizobuchi et al.

[11] Patent Number: 5,705,776
[45] Date of Patent: Jan. 6, 1998

[54] FOOD WEIGHING APPARATUS

[75] Inventors: Hiroshi Mizobuchi, Nara; Hitoshi Iwata, Yotsukaido; Yoshitaka Mikata, Himeji; Hiroshi Yamamoto, Kobe, all of Japan

[73] Assignees: House Foods Corporation, Osaka; Yamato Scale Company, Limited, Akashi, both of Japan

[21] Appl. No.: 235,708

[22] Filed: Apr. 29, 1994

[30] Foreign Application Priority Data

Apr. 30, 1993 [JP] Japan ................... 5-104218

[51] Int. Cl.$^6$ ................... G01G 13/18
[52] U.S. Cl. ........... 177/105; 177/253; 177/108; 177/25.18; 141/125; 222/148; 222/342
[58] Field of Search ............ 177/25.18, 105, 177/108, 112, 253, 262; 141/125; 222/342, 148, 185.1, 167

[56] References Cited

U.S. PATENT DOCUMENTS

| | | |
|---|---|---|
| 4,280,639 | 7/1981 | Lemnitre ............ 222/148 X |
| 5,127,483 | 7/1992 | Hough . | |
| 5,339,997 | 8/1994 | Billivant et al. ........ 222/148 X |
| 5,340,949 | 8/1994 | Fujimura et al. ........ 177/25.18 |

FOREIGN PATENT DOCUMENTS

| | | |
|---|---|---|
| 0074283 | 3/1983 | European Pat. Off. . |
| 61-258123A | 11/1986 | Japan . |
| 63-281023 | 11/1988 | Japan . |
| 5-107104 | 4/1993 | Japan . |

*Primary Examiner*—Michael L. Gellner
*Assistant Examiner*—Randy W. Gibson
*Attorney, Agent, or Firm*—Reid & Priest LLP

[57] ABSTRACT

An apparatus for weighing a softened solid rapidly and precisely, wherein no excessive force is exerted on, and no shock is given to, the load cell. The apparatus has a simplified structure including ¼ cylindrical weighing containers so that the apparatus is easy to disassemble and clean.

The inventive apparatus comprises a load cell for transmitting signals; a pair of weighing containers each having a cross-section of approximately ¼ of a cylinder, arranged closely, and installed on the load cell rotatably around center axis of rotation; a scraping member installed closely to the inner surface of the weighing containers; and a driving unit, which is not connected to said load cell, for opening and closing the weighing containers by reversely rotating them around their axes. This apparatus for weighing a softened solid discharges the weighed substance as it is scraped from the sides of the containers by the scraping member.

4 Claims, 13 Drawing Sheets

FOOD WEIGHING APPARATUS

BACKGROUND OF THE INVENTION

1. Field of the Invention

The present invention relates to an apparatus for weighing a softened solid. More particularly, the invention relates to an apparatus for weighing a softened solid, which is arranged to discharge the measured substance by the application of a signal of discharge.

2. Description of the Related Arts

In an apparatus for weighing and discharging softened solid such as sticky food, a weighing hopper is generally connected to a load cell through the hopper frame. Therefore, it is necessary to avoid any excessive force that may be exerted on the load cell when the weighed substance is discharged. When a sticky substance is weighed in a conventional device, the substance tends to remain in the weighing hopper. To discharge the residual sticky substance, the weighing hopper must be vibrated or shocked by hammering. This presents the problem of exerting an excessive force on, or giving shocks to, the load cell, this requires a relatively short long time to complete the discharge.

Also, if a motor, or other driving unit for opening and closing the measuring hopper, is connected to the load cell, the weight of the driving unit tends to be heavier than that of the load cell, resulting in it becoming a large tare in relation to the load cell. This necessitates the provision of a load cell having a large capacity. Conventional devices also present the problem that, in measuring an object of a relatively light weight such as food, it is inaccurate.

Further, in conventional ¼ cylindrical weighing containers, a ¼ cylinder is provided on the right- and left-hand sides thereof, respectively, and then, the containers rotate around a common rotational shaft. Therefore, the structure must be arranged so that each side of the ¼ cylinders must be superposed on each other. Consequently, is a problem in that the structure is complicated and disassembling and cleaning of the container is difficult. Further, there is a problem in that the structure for installing a scraping unit is complicated.

SUMMARY OF THE INVENTION

The present invention is designed to solve the abovementioned problems. It is an object of the invention to provide an apparatus for weighing a softened solid capable of executing the measurement rapidly with high precision.

It is another object of the invention to provide an apparatus for weighing a softened solid in which the structure of the ¼ cylindrical weighing containers is simplified and disassembling and cleaning thereof is relatively easy, so that the apparatus is hygienic. In order to achieve these objectives, an apparatus for weighing a softened solid according to the present invention comprises a load cell which transmits signals of weighing; weighing containers having two cross sections of approximately ¼ cylinder arranged closely, and mounted on the load cell rotatably around each center of the cylinders as the axes of rotation, respectively; a scraping member mounted to the inner surface of the containers; and a driving unit which is not connected to said load cell for opening and closing the measuring containers by rotating them around the axes of rotation of the cylinders. With the arrangement mentioned above, the apparatus discharges the weighed substance while scraping it down.

Preferably, rods are provided for opening and closing the weighing containers, and the driving unit for opening and closing the weighing containers is provided with members for opening and closing which enable the rods to rotate around the axes of rotation of the cylinders.

Further, it is preferable that the ¼ cylindrical weighing containers comprise two ¼ cylindrical portions rotatable in opposite directions, each ¼ cylindrical portion having a rod for opening and closing, and the members for opening and closing comprising two rotational levers which rotate in opposite directions.

According to the inventive device, the weight of food supplied to the two ¼ cylindrical containers of the weighing apparatus is measured by the load cell. After the measurement, the two ¼ cylindrical containers are rotated in opposite directions by means for opening and closing the containers around the axes of rotation of the cylinders, respectively. The food in the containers is scraped out by the scraping member, and dropped downward. Therefore, even if it is a softened solid such as a sticky food, it can be weighed and discharged in a short period of time. Also, as a whole, the driving unit for opening and closing the semicircular cylindrical weighing containers is independent of the load cell, and can also be installed in a range which does not expand transversely, so that no external force other than gravity is exerted on the load cell during the measuring operation. As a result, the accuracy of precise measurement is highly maintained, and an array of multiple weighing hoppers can be constituted compactly.

DETAILED DESCRIPTION OF THE PREFERRED EMBODIMENT

Hereinafter, with reference to the accompanying drawings an apparatus for measuring weight of a softened solid according to the present invention is described. An apparatus for weighing a softened solid according to the present invention can be used, for example, for weighing and discharging food such as thinly sliced burdock, sliced meat, boiled meat, sliced onion, spring onion, mushroom, and diced meat.

Figure 2:
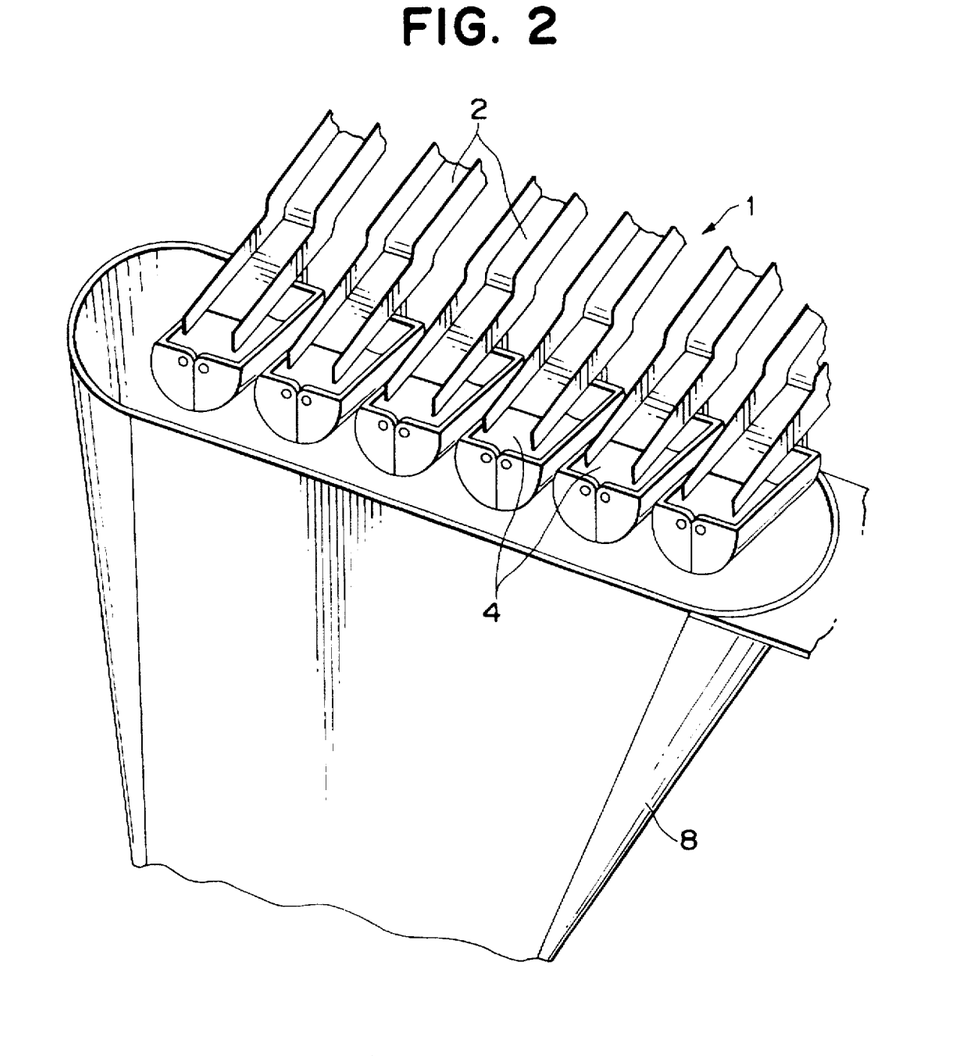
FIG. 2 is a perspective view showing an apparatus for weighing a softened solid according to the present invention.
Figure 4:
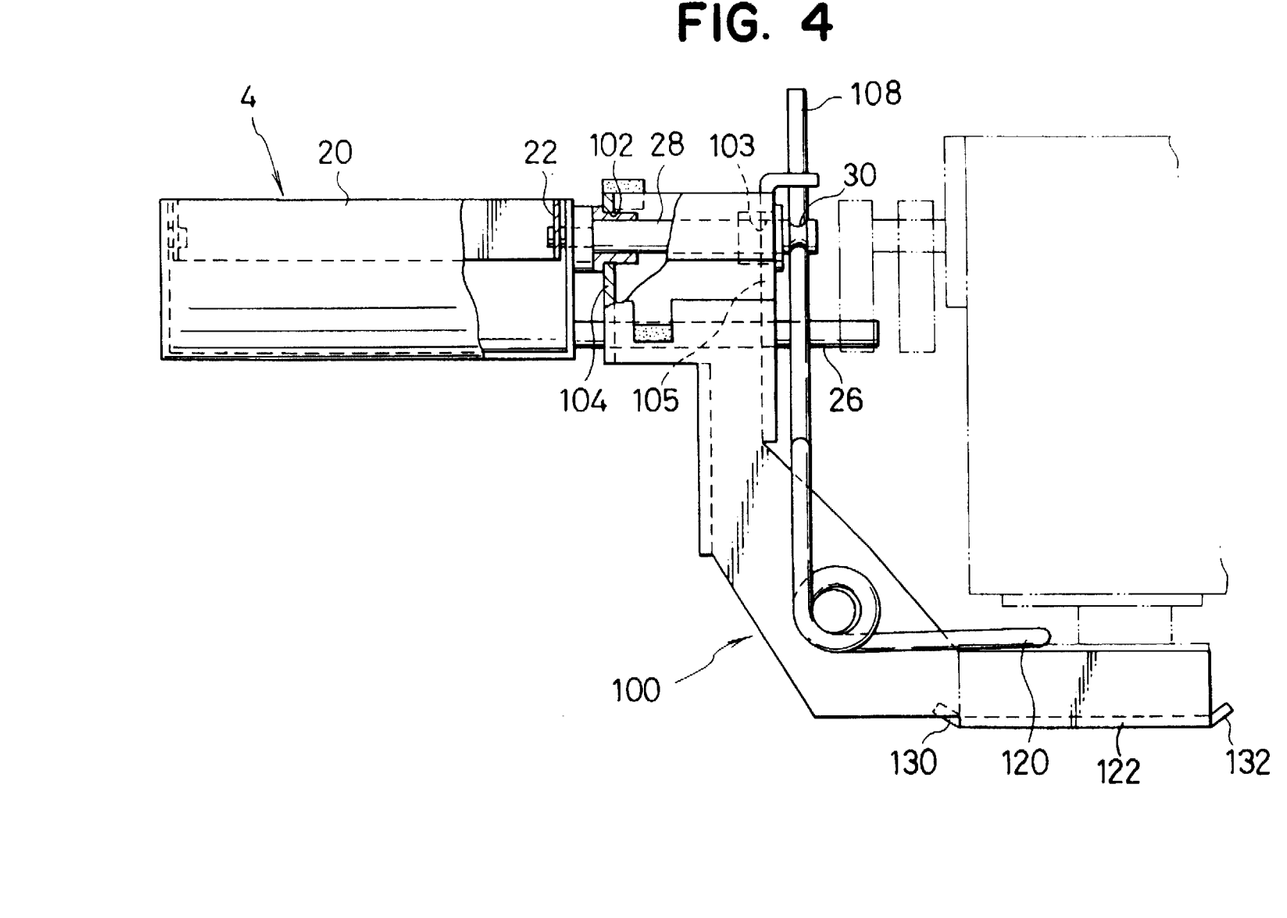
FIG. 4 is a side view showing an insertion device of an apparatus for weighing a softened solid according to the present invention.
Figure 7:
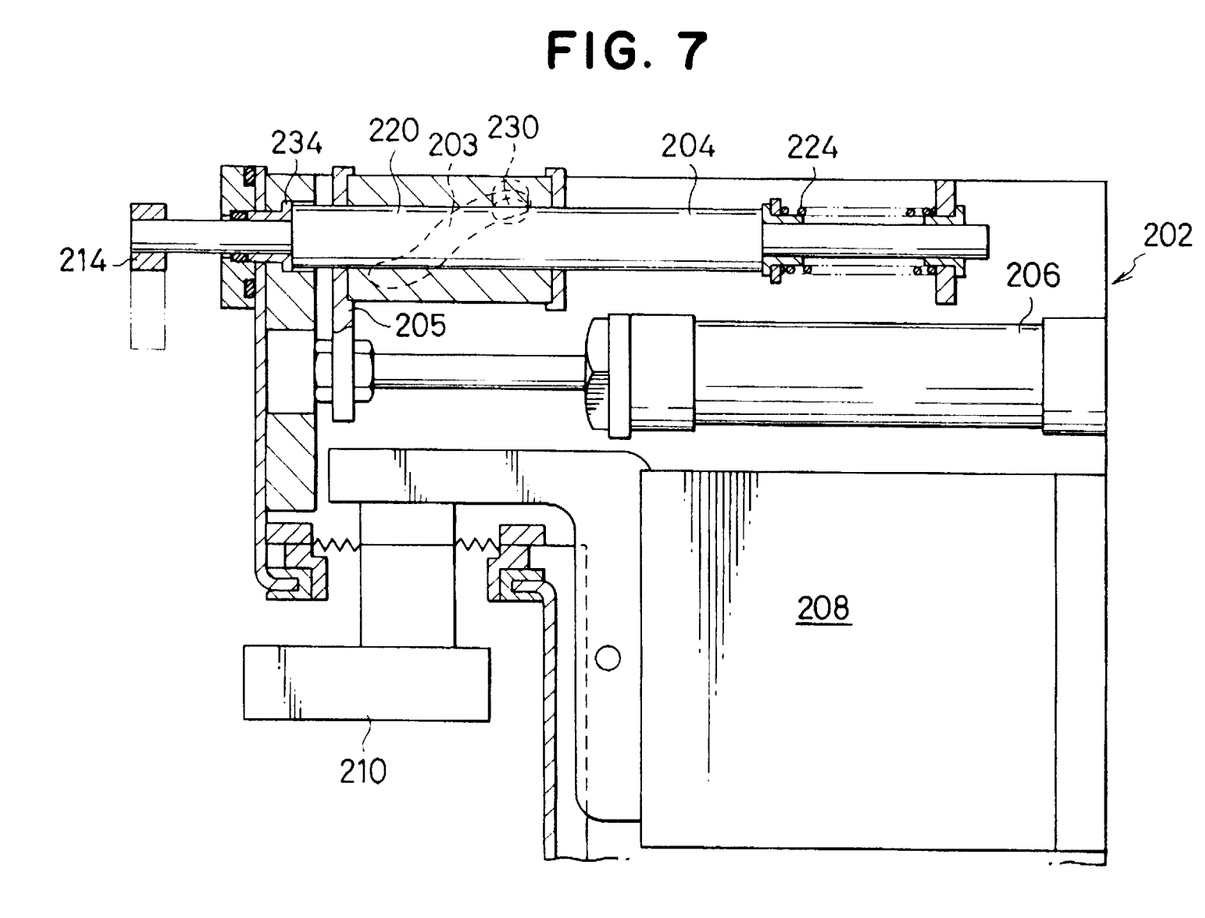
FIG. 7 is a vertically cross-sectional view showing a driving unit for an apparatus for weighing a softened solid according to the present invention.

As shown in FIG. 2, 4 and 7, food, or a softened solid, delivered from each of supply troughs 2 is supplied to each of the weighing hoppers 4 installed on the lower stage of the apparatus for weighing a softened solid 1. Each of the hoppers 4 is mounted on a load cell 208 through an installation (insertion) unit 100, described below in conjunction with FIG. 4. The food thus supplied is weighed by the load cell 208 acting as a weighing device. The food thus weighed is discharged to an aggregation chute 8 by a signal from a controller (not shown) in a driving unit 202.

The above-mentioned controller is such that, as disclosed in Japanese Patent Application Disclosure No., 60-155914 and Japanese Patent Publication No. 55-143414, for example, the weight of received food in a plurality of hoppers 4 is calculated and combined so that the weighed food comes to the predetermined weight, and by outputting a signal of discharge to the combined hoppers 4, the food having a predetermined total weight is discharged to the aggregation chute 8.

Figure 1:
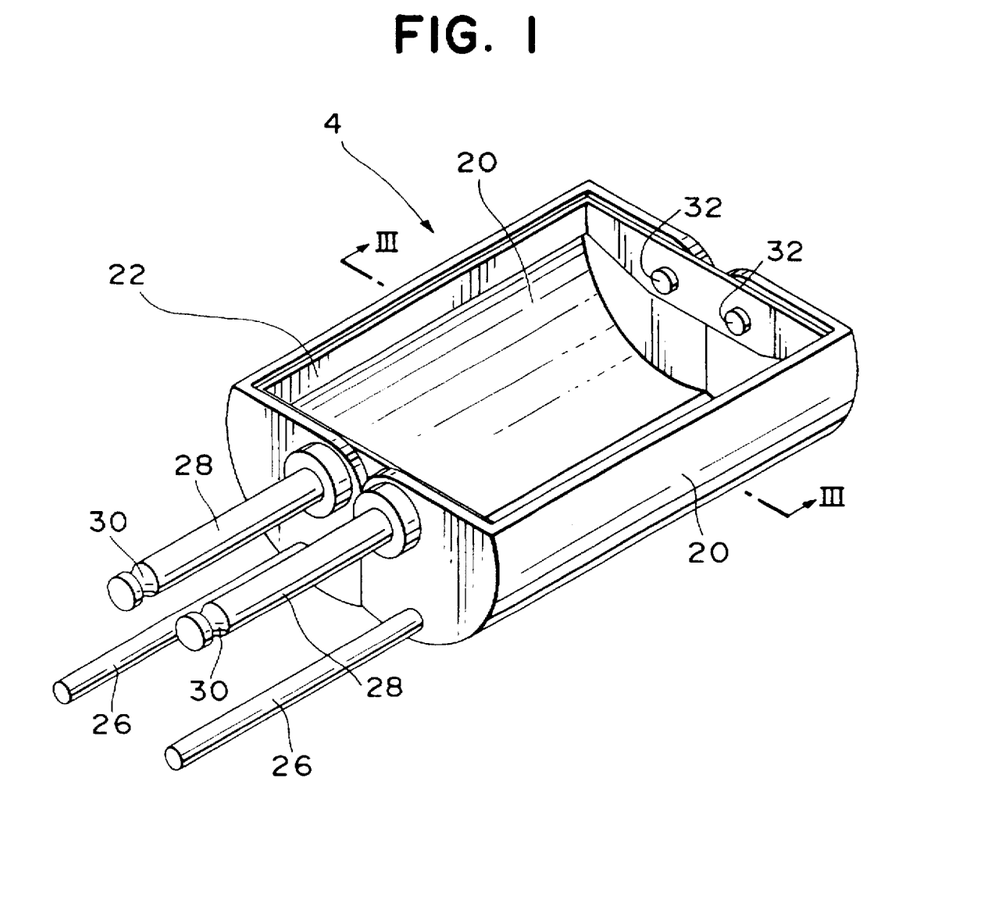
FIG. 1 is a perspective view showing a weighing hopper of an apparatus for measuring a softened solid according to the present invention.
Figure 3:
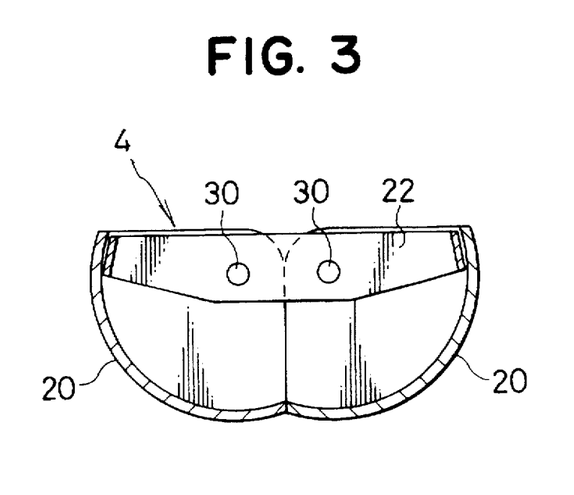
FIG. 3 is a cross-sectional view showing a weighing hopper of an apparatus for measuring weight of a softened solid according to the present invention, which is taken along line III—III in FIG. 1.

As shown in FIG. 1 and FIG. 3, the hopper 4 has a semicircular cylindrical cross section as a whole, and comprises a pair of weighing containers 20 each being ¼ of a cylinder and installed rotatably around the rotational axis of each cylinder, and a scraping member 22 fixedly installed horizontally so that it is close to the inner surface of the rotative ¼ cylindrical weighing containers 20. The ¼ cylindrical weighing containers can be installed so as not to superpose the sides of the containers, so that they can be disassembled and cleaned easily. Each of the ¼ cylindrical weighing containers 20 comprises rods 26 fixed to the containers for opening and closing the containers and supporting rods 28 supported pivotally. The supporting rods 28 are fixed to the ¼ cylindrical containers 20. The scraping member 22 is supported pivotally by pins 32 on both side surfaces of each of the ¼ cylindrical weighing containers. The weighing containers can be disassembled easily by bending the scraping member 22 inwardly and removing it from the pins 32. Grooves 30 are formed in the vicinity of the tips of the supporting rods 28. By the rotation of the pair of ¼ cylindrical weighing containers 20, the scraping member 22 rotates reversely while it scrapes down food stuck to the inner surface of the ¼ cylindrical weighing containers 20. Thus the weighed food is completely discharged to the aggregation chute 8.

Figure 5:
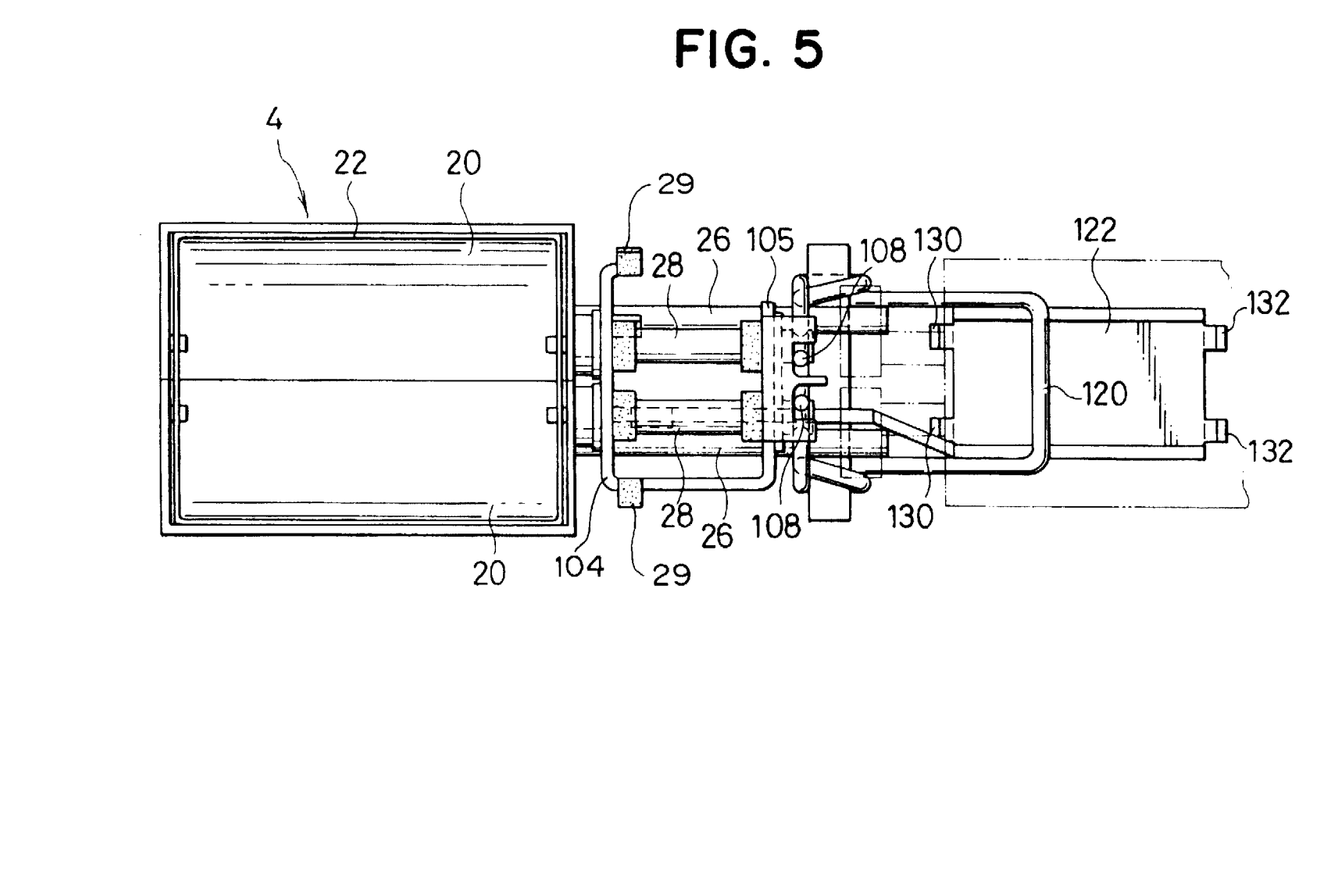
FIG. 5 is a plan view showing an insertion device of an apparatus for weighing a softened solid according to the present invention.
Figure 6:
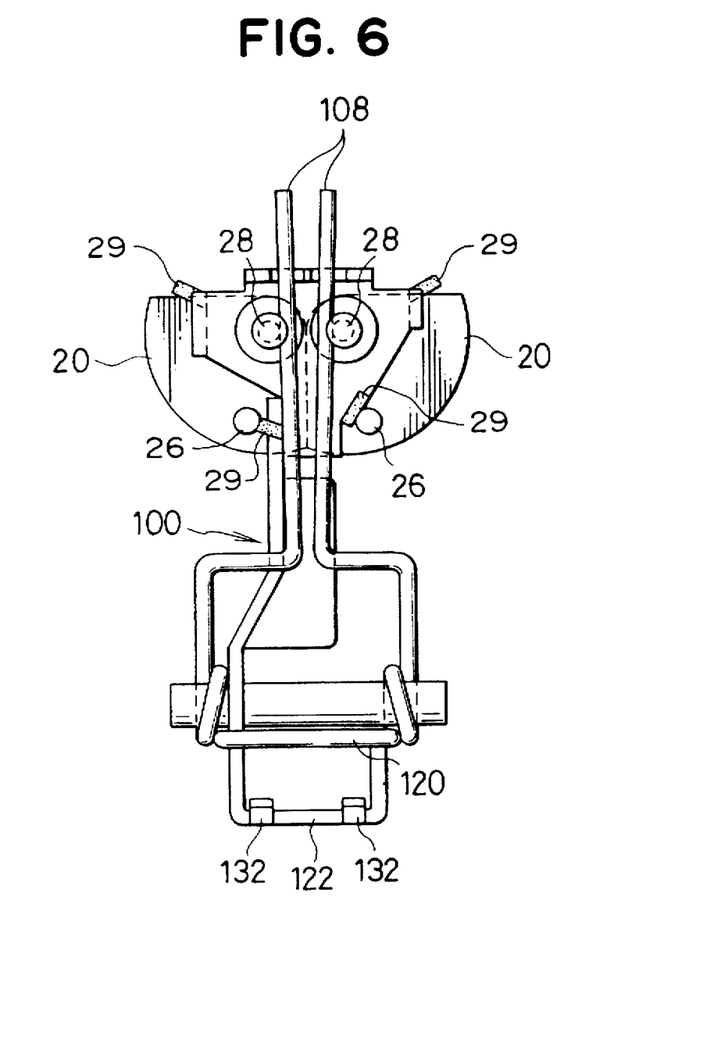
FIG. 6 is a view illustrating mounting of the weighing hopper and insertion unit.

As shown in FIGS. 4, 5, and 6, the insertion unit 100 is substantially an L-shaped figure, and on one side end portion thereof, there are arranged a front board 104 having holes 102 into which the supporting rods 28 pass; a supporting board 105 having holes 103 into which the supporting rods 28 also pass; and parallel springs 108 engaged with the grooves 30. Further, extrusions 29 are arranged to stop the movement of the ¼ cylindrical weighing containers 20 by abutting them to the rods 26 for opening and closing just before the containers 20 collide against each other so that the containers do not make loud noises. On the other side end portion of the L-shaped insertion unit 100, a torsion spring 120 and a fixing board 122 are mounted in parallel to each other. The torsion spring 120 and the parallel springs 108 are integrally formed. There are formed an inclined front extrusion 130 and rear extrusion 132 at the front and rear (the right and left in FIG. 4) of the fixing board 122.

Figure 8:
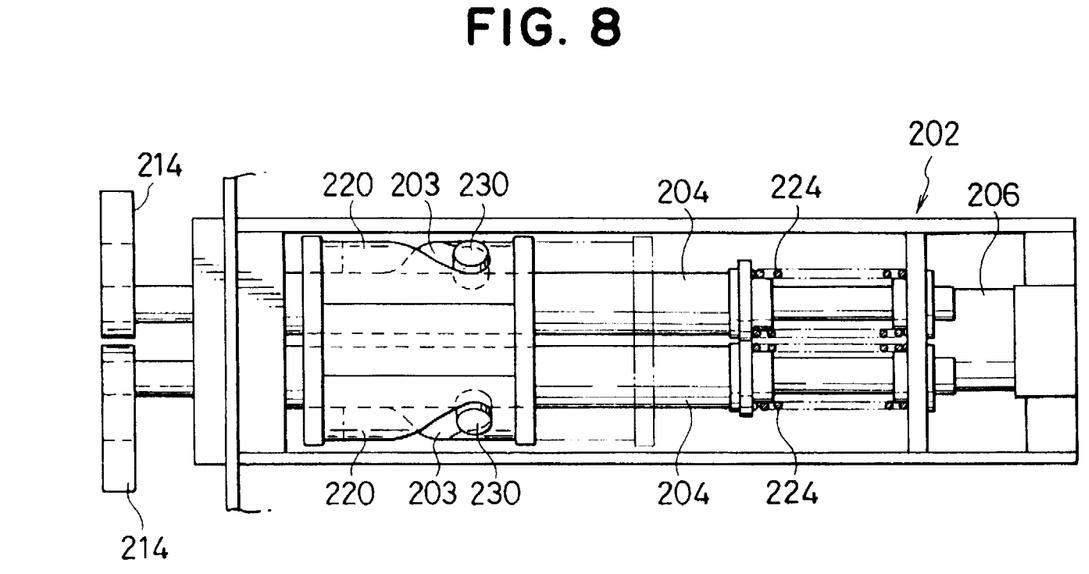
FIG. 8 is a plan view showing the driving unit for an apparatus for weighing a softened solid according to the present invention.
Figure 9:
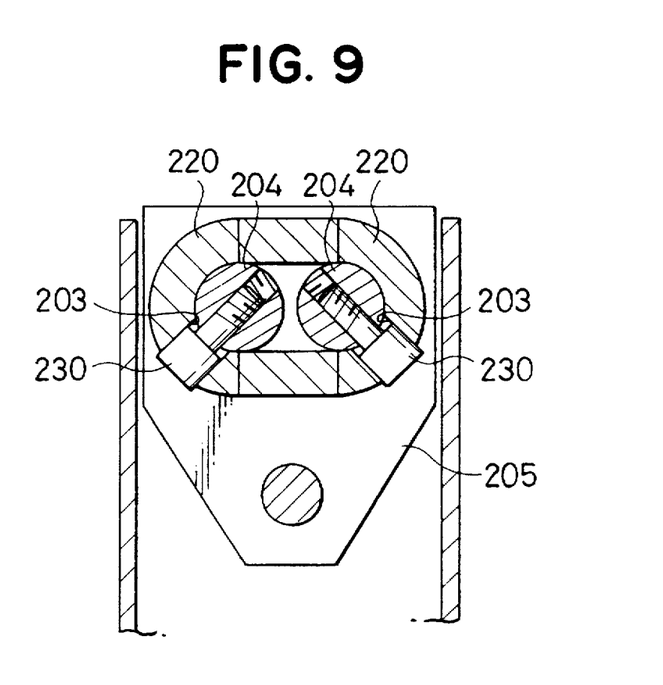
FIG. 9 is a vertically cross-sectional view showing the cam system of driving unit for an apparatus for weighing a softened solid according to the present invention.

As shown in FIGS. 7, 8, and 9, the main body of the driving unit 202 for opening and closing containers 20 has an air cylinder 206 for reciprocating a pair of reciprocating members 204, and cam members 220 through a connection member 205. On the front portions of the reciprocating members 204 (left end part in FIG. 7), there are mounted fork-shaped open and close arms 214 engaged with the rods 26 for opening and closing the weighing containers. On the circumference of the reciprocating members 204, above-mentioned cam members 220 are arranged with cams 203 for making the reciprocating members 204 rotate. Cam pins 230 sliding in the cams 203 are installed on reciprocating members 204. On the rear end portion of the reciprocating members 204, compression springs 224 are arranged to press the reciprocating members at all times. Stoppers 234 are mounted in the critical position for forward movement of the reciprocating members 204, stoppers 234 are mounted for abutting the reciprocating members 204.

Figure 10:
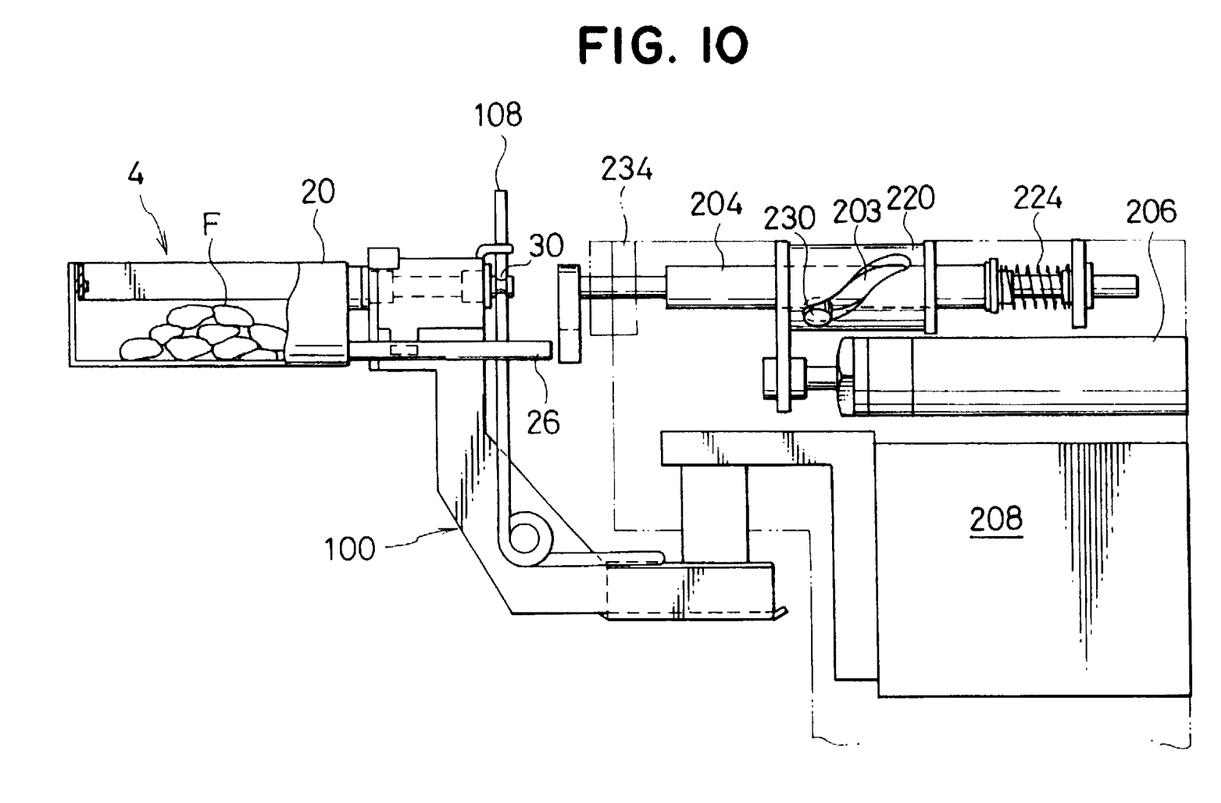
FIG. 10 is a view illustrating measurement during weighing of a softened solid according to the present invention.

Next, the the operation of the apparatus for measuring a softened solid 1 is described. As shown in FIG. 10, during weighing, the air cylinder 206 of the apparatus contracts, the compression springs 224 are pressed, the cam members 220 and the reciprocating members 204 are in the retracted position, and the open and close arms 214 are not engaged to the open and close rods 26. In other words, the insertion unit 100 and the hopper 4 are supported by the load cell 208. The food F which is delivered to the hopper 4 from the supply trough 2 is weighed by the load cell 208.

Figure 11:
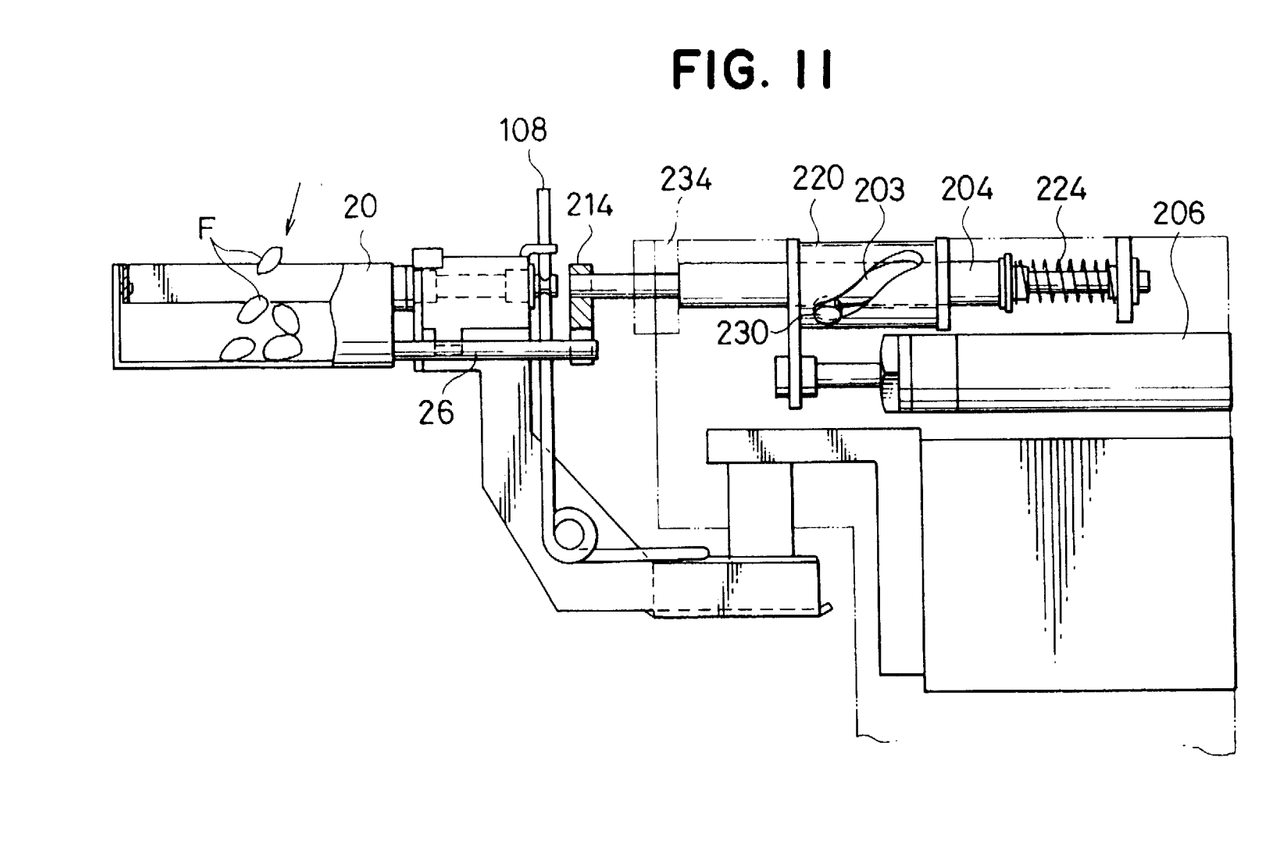
FIG. 11 is a view illustrating preparation for opening the weighing hopper of an apparatus for weighing a softened solid according to the present invention.
Figure 13:
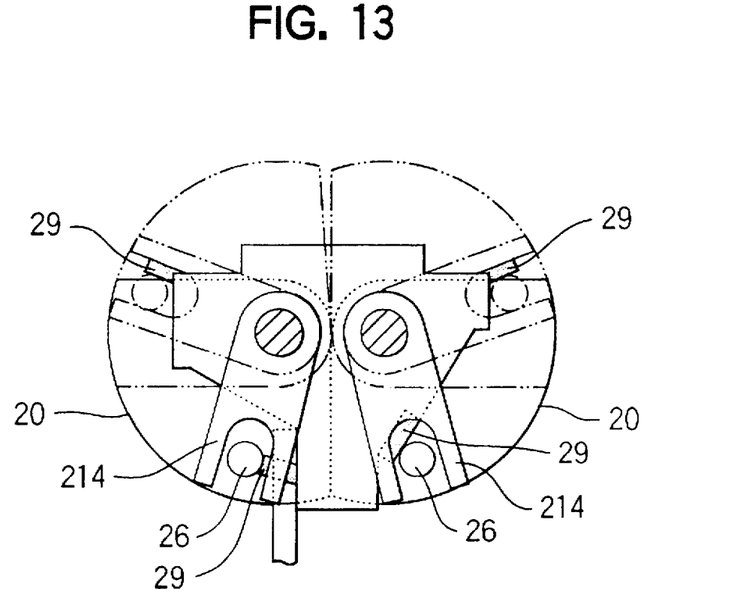
FIG. 13 is a view illustrating the operation of arms for opening and closing of an apparatus for weighing a softened solid according to the present invention.

When the controller (not shown) outputs a discharge signal for the hopper 4, the air cylinder 206 extends to the intermediate position as a first step as shown in FIGS. 11 and FIG. 13, the cam members 220 and the reciprocating members 204 are moved forward together, thus the reciprocating members 204 abut upon the stoppers 234. In other words, while the reciprocating members 204 are being moved, the cam pins 230 remain fixed to the front end portion of the cams 203 by the action of the compression springs 224. Hence the reciprocating members 204 do not rotate. As a result, the open and close rods 26 engage with the fork shaped notches of the arms 214 for opening and closing.

Figure 12:
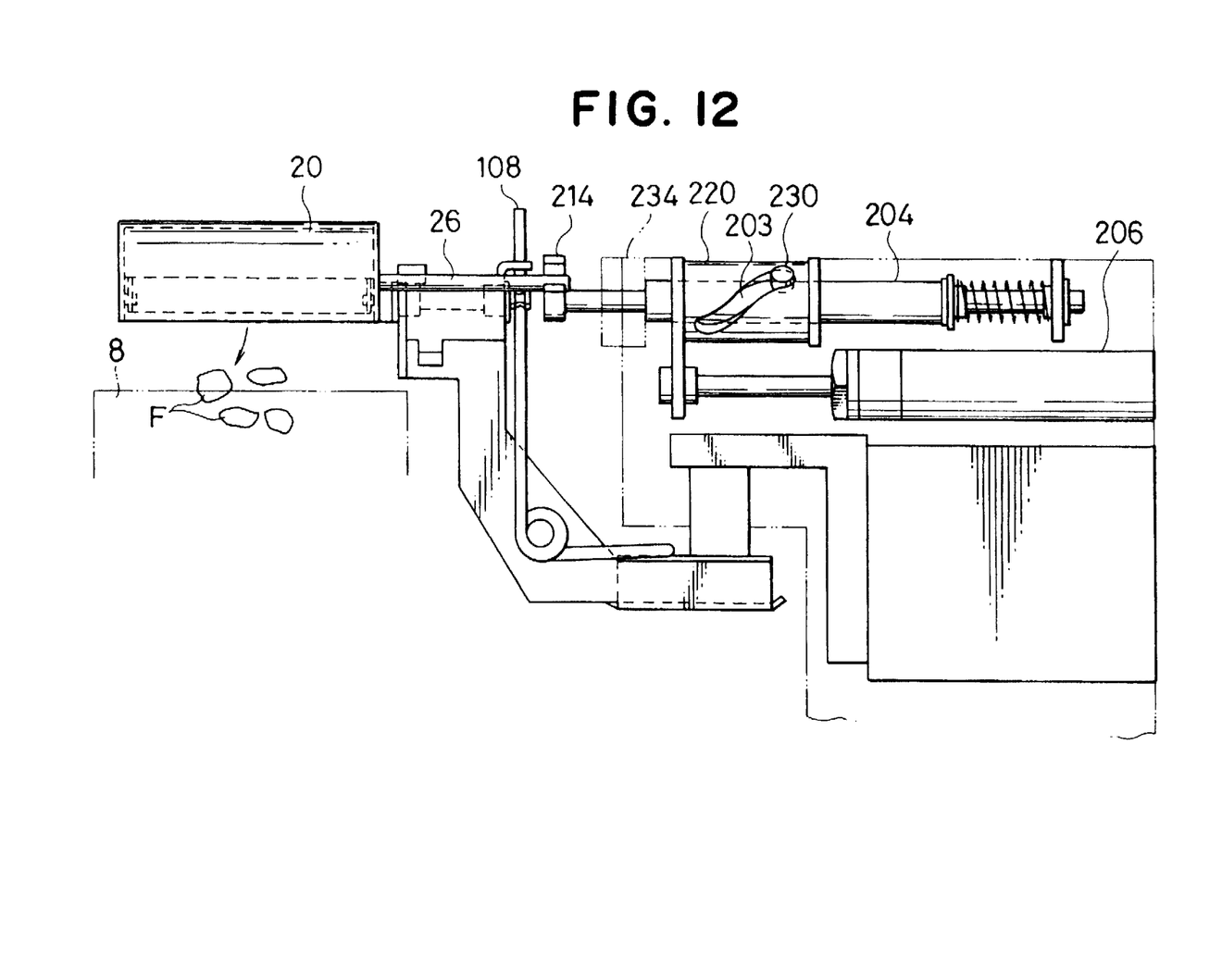
FIG. 12 is a view illustrating an open weighing hopper of an apparatus for weighing a softened solid according to the present invention.

As a second step, the air cylinder 206 further extends as shown in FIGS. 12 and FIG. 13. Then, since the reciprocating members 204 are stopped by the stopper 234, only the cam members 220 are advanced. In other words, by this forward movement of the cam members 220, the reciprocating members 204 rotate, thereby the open and close arms 214 are moved rotatably so that the open and close rods 26 move in the opening direction, and the food F supplied to the hopper 4 and weighed is discharged to the chute 8.

When the discharge of the food F from the hopper 4 is completed, the air cylinder 206 contracts to be in the state of the first step, thereby the hopper 4 is closed. The air cylinder 206 further contracts and the open and close arms 214 are disengaged from the rods for opening and closing 26, thereby the hopper 4 returns to the state capable of measuring. When the measuring hopper is opened and closed, the open and close rods 26 abut the extrusions 29 before the ¼ cylindrical weighing containers 20 contact each other, thereby preventing the occurrence of noises due to a collision.

The mounting state of the hopper 4 on the insertion unit 100 is supported by engagement of parallel springs 108 with the grooves 30 of the supporting rods 28. Therefore, just by bending the parallel springs 108 inwardly to release this engagement, the hopper 4 can be removed easily from the insertion unit 100. The mounting state of the insertion unit 100 on the mounting member 210 is supported by a bending spring member 120 which, together with the fixing board 122, holds the mounting member 210 and front and rear extrusions 130, 132 block the relative movement of both members in the forward and rear directions. The insertion unit 100 can be removed from the mounting member 210 by deforming the bending spring member 120.

According to the present invention, there is no possibility that any excessive force is exerted on, or shock is given to, the load cell, and rapid and highly precise measurement can be effectively carried out. Also, since the structure of the ¼ cylindrical weighing containers is simple, the disassembling and cleaning of them are easy, and apparatus can be easily kept in a the hygienic condition.

What is claimed is:

1. An apparatus for weighing a softened solid comprising:
    a load cell for transmitting weighing signals;
    first and second weighing containers, each of said weighing containers having a cross-section of approximately ¼ cylinder, said first weighing container having a first center axis of rotation and said second weighing container having a second center axis of rotation different from and parallel to that of said first center axis of rotation, and said first and second weighing containers being installed on said load cell rotatably around said first and second axes of rotation, respectively, wherein said first and second weighing containers do not overlap when they are opened and closed;
    a scraping member installed closely to the inner surface of said first and second weighing containers for discharging the solid from said containers by scraping the solid out of said first and second weighing containers, wherein said scraping member is attached to both said first and second center axes of rotation; and
    a driving unit for opening and closing said first and second weighing containers by rotating them in opposite directions around said first and second center axes of rotation, respectively;
    wherein said driving unit is not connected to said load cell.

2. An apparatus for weighing a softened solid according to claim 1, further comprising:
    opening and closing rods attached to said first and second weighing containers for opening and closing said first and second weighing containers; and
    reciprocating members attached to said driving unit for engaging said opening and closing rods for opening and closing said first and second weighing containers.

3. An apparatus for weighing a softened solid according to claim 2, wherein:
    said reciprocating members comprise a pair of rotational levers rotatable in opposite directions.

4. An apparatus for weighing a softened solid according to claim 1, further comprising:
    first and second support rods respectively attached to said first and second weighing containers and being rotatable around said first and second center axes of said first and second weighing containers, respectively, for connecting said first and second containers to said load cell through an insertion unit, so that said first and second weighing containers are installed on said load cell rotatably around said first and second center axes of rotation, respectively.

* * * * *